US011128534B2

(12) United States Patent
Mermoud et al.

(10) Patent No.: US 11,128,534 B2
(45) Date of Patent: Sep. 21, 2021

(54) REFINEMENT OF DEVICE CLASSIFICATION AND CLUSTERING BASED ON POLICY COLORING

(71) Applicant: Cisco Technology, Inc., San Jose, CA (US)

(72) Inventors: Grégory Mermoud, Veyras (CH); Pierre-André Savalle, Rueil-Malmaison (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/194,466

(22) Filed: Nov. 19, 2018

(65) Prior Publication Data

US 2020/0162329 A1 May 21, 2020

(51) Int. Cl.
*H04L 12/24* (2006.01)
*G06K 9/62* (2006.01)
*G06K 9/66* (2006.01)
*H04L 12/26* (2006.01)
*H04L 29/06* (2006.01)

(52) U.S. Cl.
CPC ........ *H04L 41/0893* (2013.01); *G06K 9/6218* (2013.01); *G06K 9/6234* (2013.01); *G06K 9/6267* (2013.01); *G06K 9/66* (2013.01); *H04L 41/12* (2013.01); *H04L 41/16* (2013.01); *H04L 43/04* (2013.01); *H04L 43/065* (2013.01); *H04L 63/20* (2013.01)

(58) Field of Classification Search
CPC ... H04L 41/0893; H04L 41/12; G06K 9/6218; G06K 9/6234
See application file for complete search history.

(56) References Cited

U.S. PATENT DOCUMENTS

| 7,552,472 | B2 | 6/2009 | Baffes et al. | |
|---|---|---|---|---|
| 8,341,717 | B1 * | 12/2012 | Delker | H04L 63/20 726/10 |
| 8,626,675 | B1 | 1/2014 | Satish | |
| 10,089,582 | B2 * | 10/2018 | Fawaz | G06N 5/043 |
| 10,440,577 | B1 * | 10/2019 | Vasseur | H04W 24/08 |
| 2013/0254153 | A1 * | 9/2013 | Marcheret | G06N 7/00 706/59 |

(Continued)

*Primary Examiner* — William G Trost, IV
*Assistant Examiner* — Monishwar Mohan
(74) *Attorney, Agent, or Firm* — Behmke Innovation Group LLC; Kenneth J. Heywood; Jonathon P. Western (57) ABSTRACT

In one embodiment, a device classification service receives data indicative of network traffic policies assigned to a plurality of device types. The device classification service associates measures of policy restrictiveness with the device types, based on the received data indicative of the network traffic policies assigned to the plurality of device types. The device classification service determines misclassification costs associated with a machine learning-based device type classifier of the service misclassifying an endpoint device of one of the plurality device types with another of the plurality of device types, based on their associated measures of policy restrictiveness. The device classification service adjusts the machine learning-based device type classifier to account for the determined misclassification costs.

18 Claims, 7 Drawing Sheets

(56) References Cited

U.S. PATENT DOCUMENTS

| | | | |
|---|---|---|---|
| 2013/0276055 A1* | 10/2013 | Jacobson | H04L 63/20 726/1 |
| 2016/0028751 A1* | 1/2016 | Cruz Mota | H04L 63/1408 726/23 |
| 2016/0028762 A1* | 1/2016 | Di Pietro | H04L 63/1458 726/23 |
| 2017/0279829 A1* | 9/2017 | Vasseur | H04L 41/0893 |
| 2017/0279839 A1* | 9/2017 | Vasseur | G06F 17/18 |
| 2017/0310691 A1* | 10/2017 | Vasseur | H04L 41/147 |
| 2017/0374090 A1* | 12/2017 | McGrew | H04L 47/2483 |
| 2018/0287902 A1 | 10/2018 | Chitalia et al. | |
| 2018/0367428 A1* | 12/2018 | Di Pietro | H04L 63/1408 |
| 2019/0028909 A1* | 1/2019 | Mermoud | H04W 24/08 |
| 2019/0102683 A1* | 4/2019 | Jayaraman | G06N 20/00 |
| 2019/0138938 A1* | 5/2019 | Vasseur | H04L 43/0888 |
| 2019/0238568 A1* | 8/2019 | Goswami | H04L 63/1416 |
| 2019/0258953 A1* | 8/2019 | Lang | G06N 5/003 |
| 2019/0356553 A1* | 11/2019 | Mermoud | H04L 41/16 |
| 2020/0067777 A1* | 2/2020 | Tandel | H04L 41/12 |
| 2020/0074571 A1* | 3/2020 | Boyle | G06F 16/29 |

\* cited by examiner

REFINEMENT OF DEVICE CLASSIFICATION AND CLUSTERING BASED ON POLICY COLORING

TECHNICAL FIELD

The present disclosure relates generally to computer networks, and, more particularly, to the refinement of device classification and clustering based on policy coloring.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device classification service receives data indicative of network traffic policies assigned to a plurality of device types. The device classification service associates measures of policy restrictiveness with the device types, based on the received data indicative of the network traffic policies assigned to the plurality of device types. The device classification service determines misclassification costs associated with a machine learning-based device type classifier of the service misclassifying an endpoint device of one of the plurality device types with another of the plurality of device types, based on their associated measures of policy restrictiveness. The device classification service adjusts the machine learning-based device type classifier to account for the determined misclassification costs.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
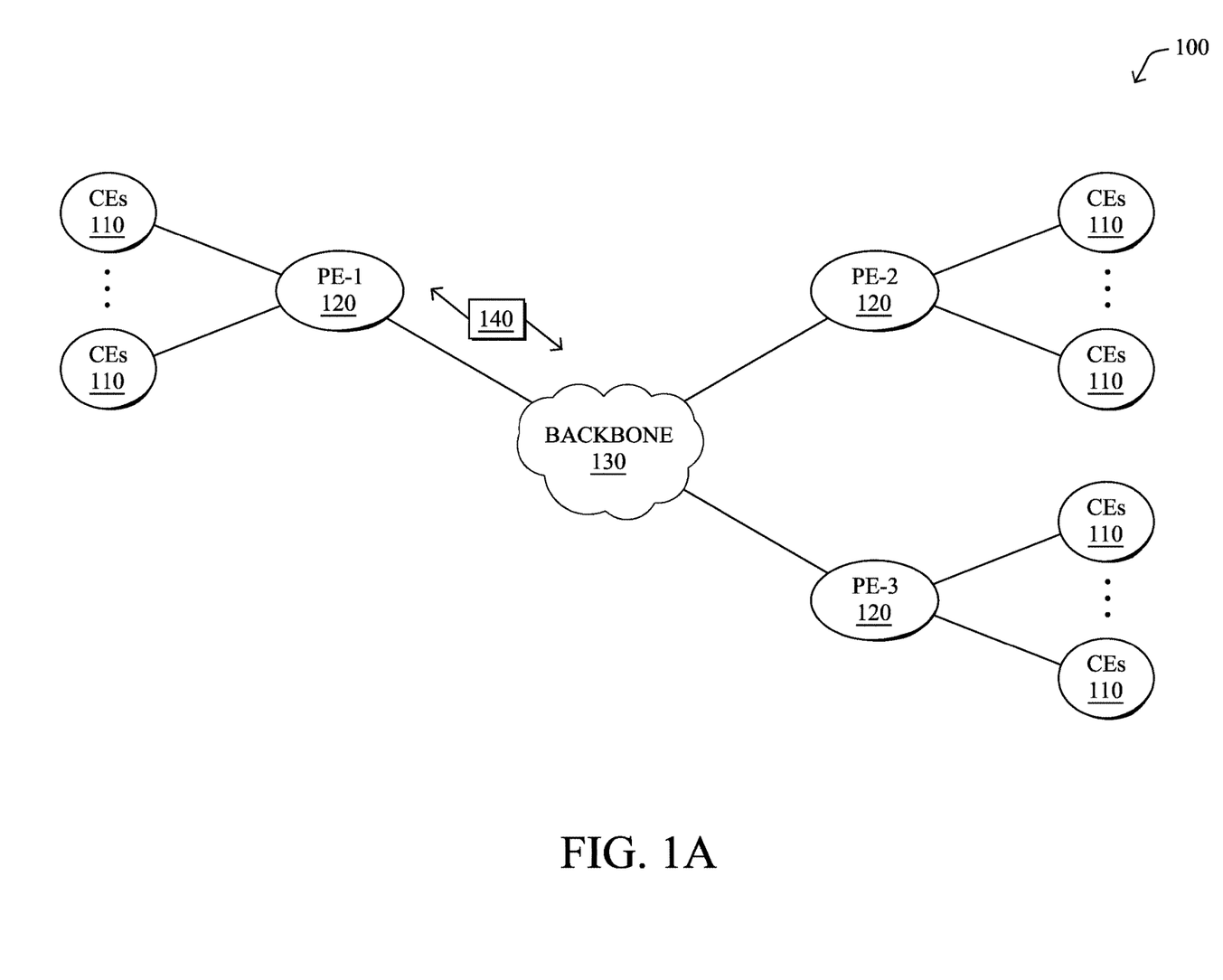
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
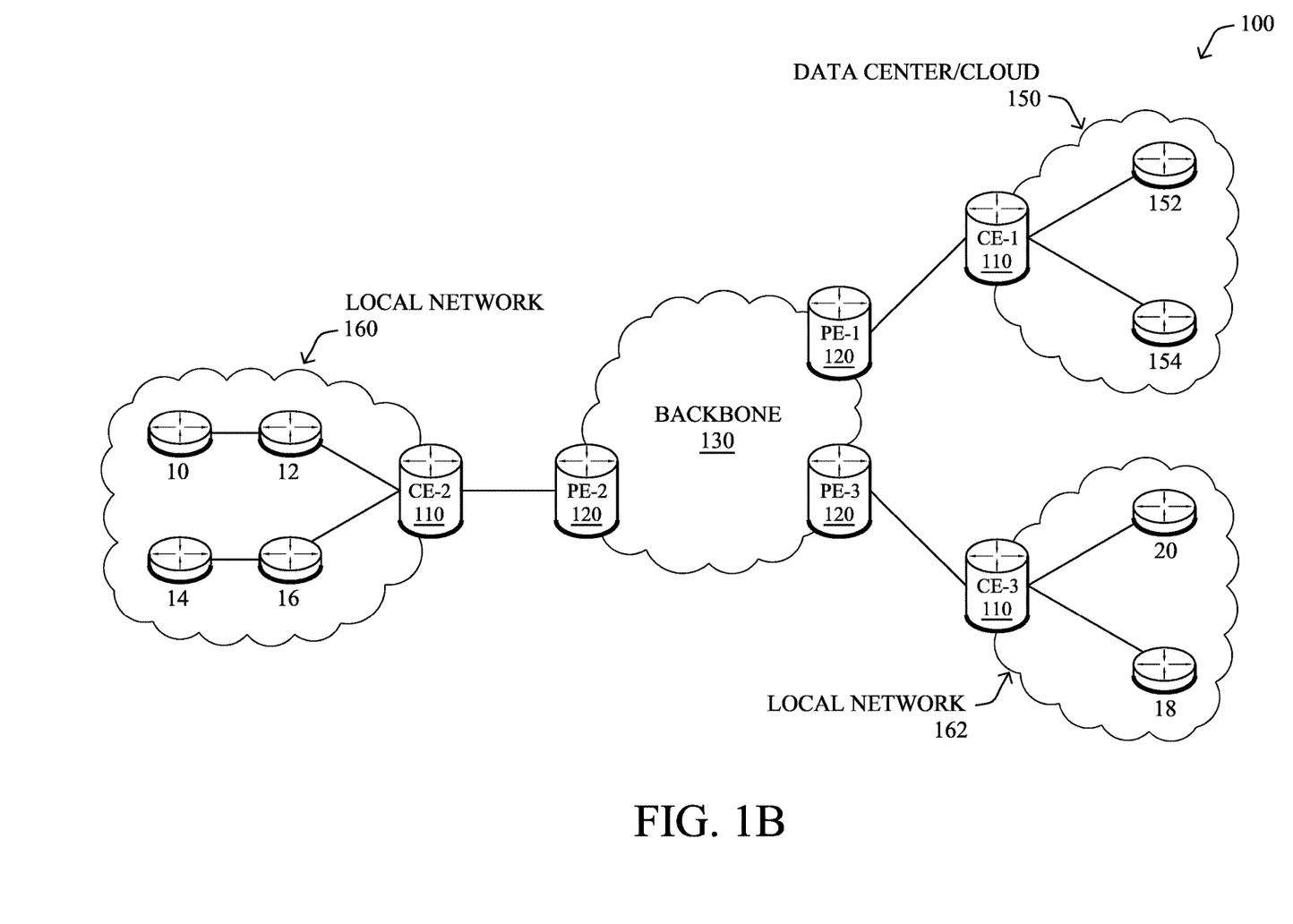

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
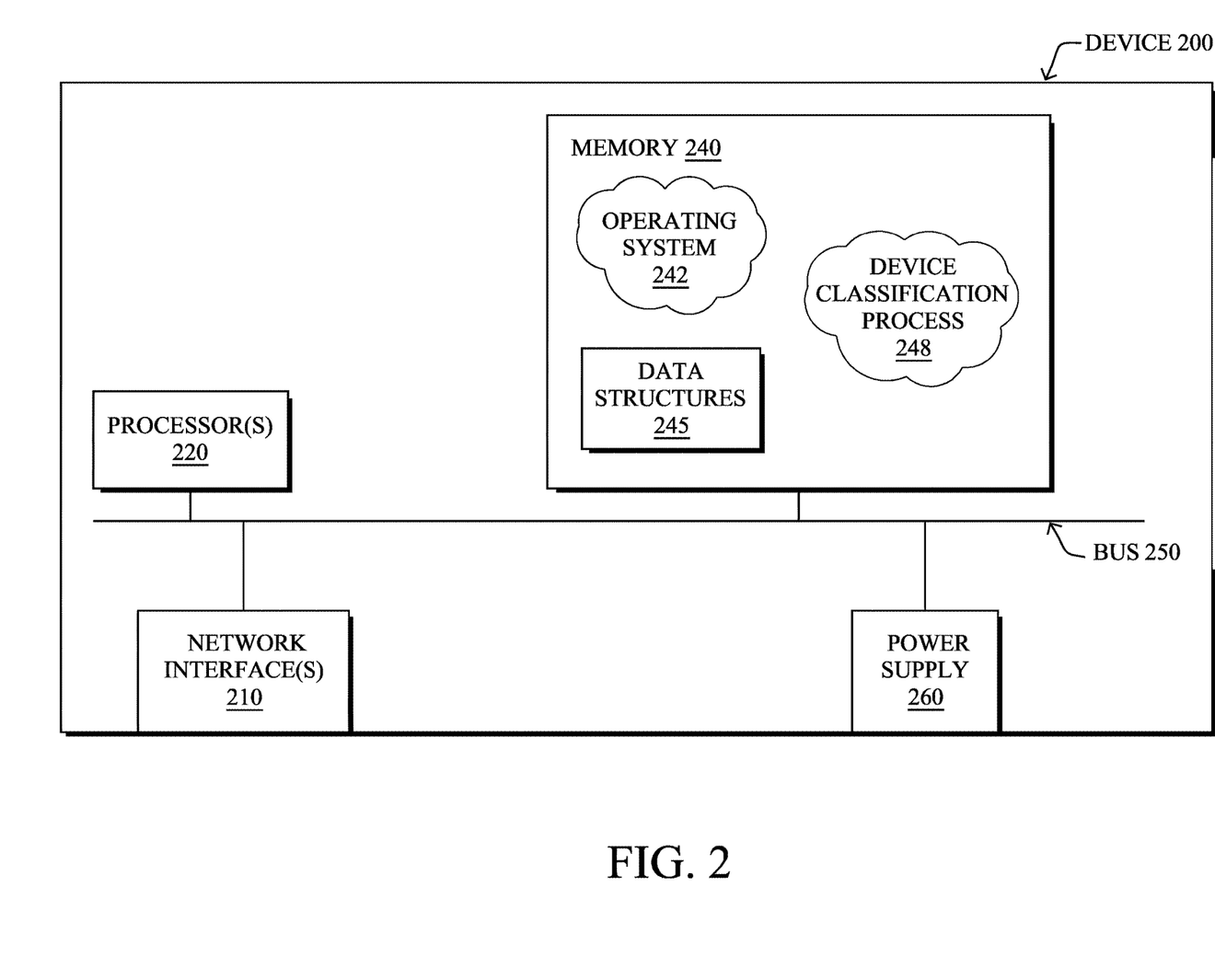
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
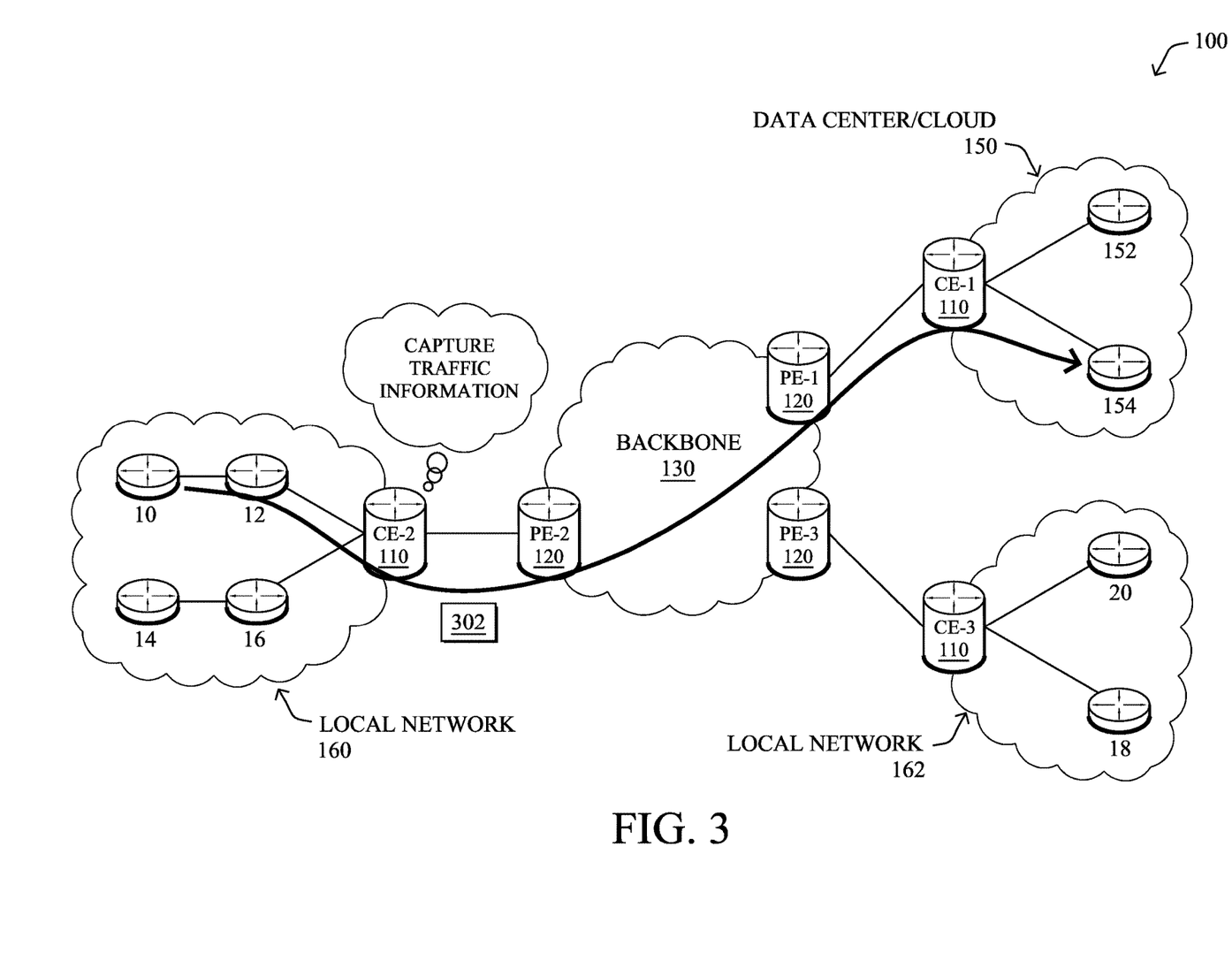
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

Figure 4:
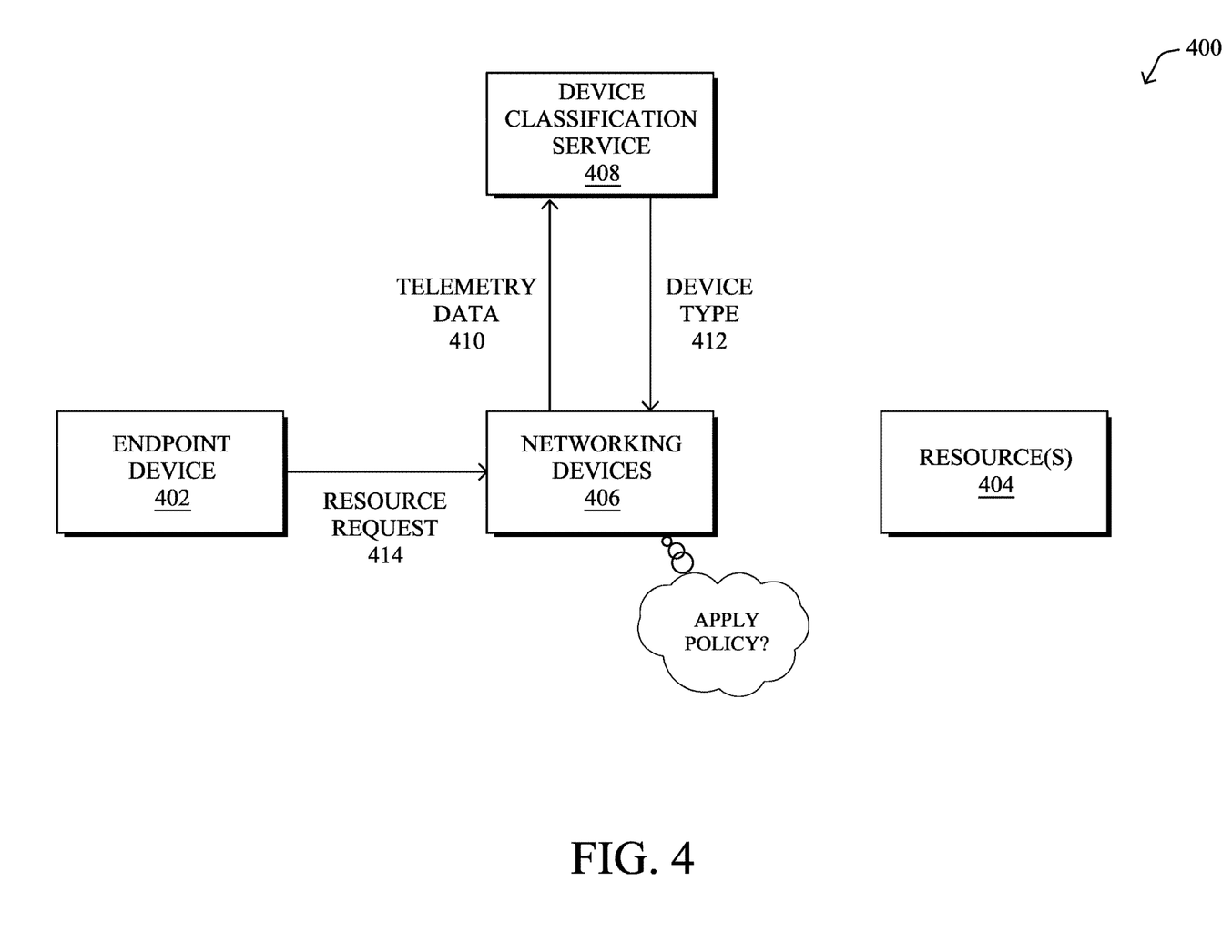
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, a device classification service may leverage machine learning to classify an endpoint device in a network as being of a certain device type, based on the observed network traffic of the endpoint device. One of the critical challenges faced by engineers of machine learning systems is the evaluation of the algorithmic performance of the learning. This is particularly acute in the context of device classification systems because different misclassifications can have a very different criticality depending on their nature. As an example, confusing an iPhone with an iPad may be considered, for most practical purposes, quite innocuous. On the other hand, confusing an iPhone with an MRI machine can have quite disastrous consequences. Indeed, the main consequence of misclassification of an endpoint device may be the application of the wrong network policy to the endpoint device and segmentation of the traffic of the device (e.g., by granting the endpoint too many rights on the network or vice-versa).

Unfortunately, standard machine learning performance metrics, such as precision, recall, etc., do not take into account the impact of a given misclassification. Notably, a device type classifier with lower precision may actually be preferred to a classifier with higher precision, if the misclassifications by the lower precision classifier are less consequential than misclassifications by the higher precision classifier. Consequently, existing device type classification systems do not optimize their behaviors to minimize and/or prevent the most critical misclassifications or, at minimum, opt to label a telemetry sample as being of an unknown device type when unsure.

Refinement of Device Classification and Clustering Based on Policy Coloring

The techniques herein introduce a series of mechanisms to evaluate the impact of device type misclassifications by a device classification service and incorporate this information into the underlying machine learning processes of the service. In some aspects, the techniques allow the device classification service to compute and assign measures of policy restrictiveness to network policies for different device types (e.g., blacklisting certain devices from Internet access, etc.). In further aspects, the service may use these measures to estimate and increase the quality of the classification and/or clustering of the service. In particular, mixing up devices that were classified differently in other networks, especially if the corresponding policies have different measures of restrictiveness, may be an indicator that such a mistake is more critical than another, thus leading to more impact-centric device classification.

Specifically, according to one or more embodiments of the disclosure as described in detail below, a device classification service receives data indicative of network traffic policies assigned to a plurality of device types. The device classification service associates measures of policy restrictiveness with the device types, based on the received data indicative of the network traffic policies assigned to the plurality of device types. The device classification service determines misclassification costs associated with a machine learning-based device type classifier of the service misclassifying an endpoint device of one of the plurality device types with another of the plurality of device types, based on their associated measures of policy restrictiveness. The device classification service adjusts the machine learning-based device type classifier to account for the determined misclassification costs.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 5:
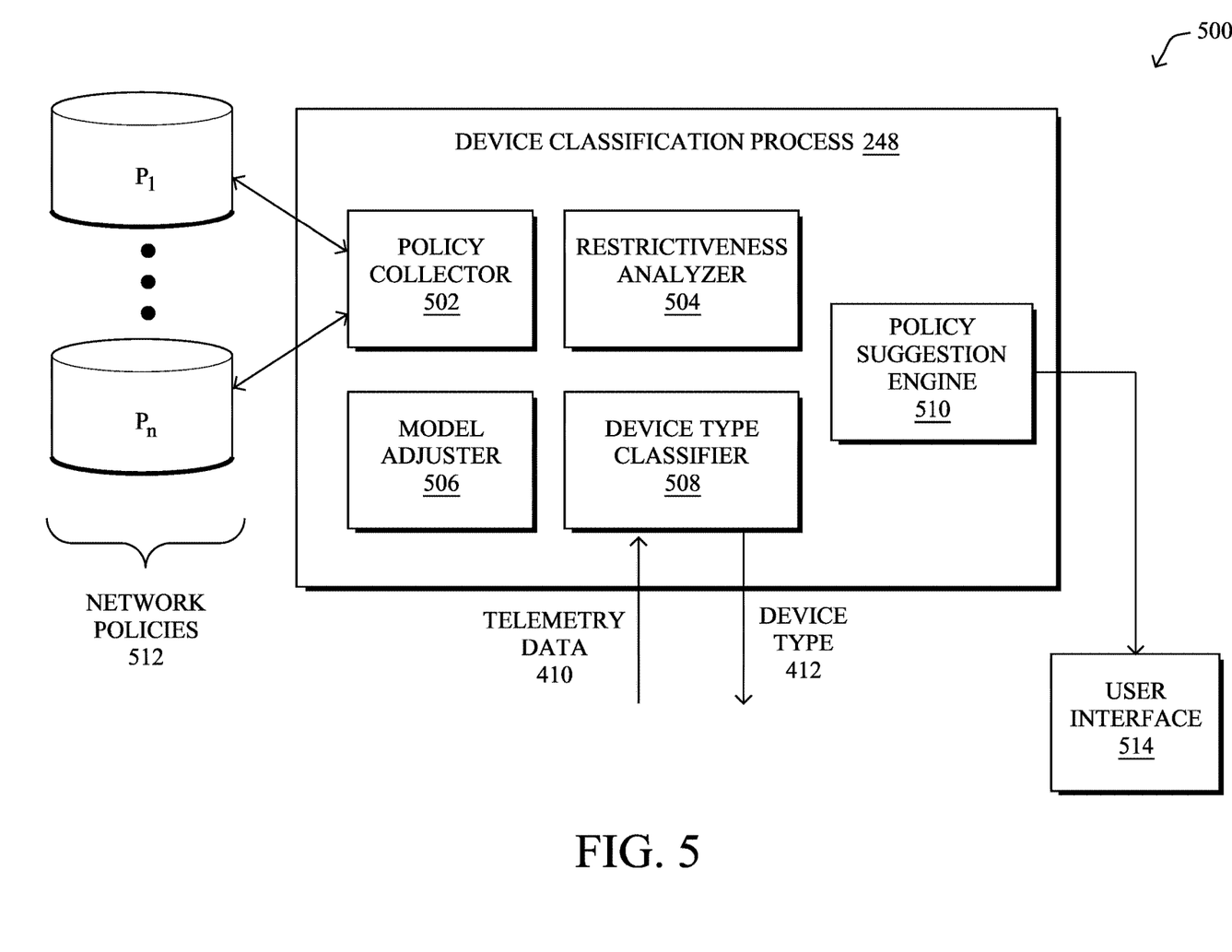
FIG. 5 illustrates an example architecture for the refinement of device classification and clustering based on policy coloring.

Operationally, FIG. 5 illustrates an example architecture 500 for the refinement of device classification and clustering based on policy coloring, according to various embodiments. As shown, device classification process 248, which can be used to provide a device classification service (e.g., service 408 shown in FIG. 4) may comprise any or all of the following components: a policy collector 502, a restrictiveness analyzer 504, a model adjuster 506, a device type classifier 508, and/or a policy suggestion engine 510. Further, these components 502-510 may be implemented in a distributed manner or implemented as its own stand-alone service, either as part of the local network under observation or as a remote service. In addition, the functionalities of the components of architecture 500 may be combined, omitted, or implemented as part of other processes, as desired.

At the core of device classification process 248 is device type classifier 508 that is configured to assign a device type 412 to an endpoint device based on its captured telemetry data 410. In some cases, device type classifier 508 may leverage heuristics, rules, statistics, or the like, to label an endpoint device with a device type. In further embodiments, however, device type classifier 508 may leverage machine learning, to perform the classifications (e.g., based on the protocols used by the endpoint device, other traffic features, etc.). For example, device type classifier 508 may include a multi-class classification model such as a decisions tree based model (e.g., a random forest, etc.) trained using telemetry samples labeled with the known device types of their associated endpoint devices.

In further cases, device type classifier 508 may leverage a clustering approach that uses the traffic telemetry data as input and attempts to group similarly behaving devices by their network traffic behaviors. Device type classifier 508 can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

Policy engines, such as the Identity Services Engine (ISE) from Cisco Systems, Inc., allow network administrators to define groups of devices and assign policies to them. For example, one policy may prevent MRI machines from accessing the Internet, while another may restrict which websites a guest iPhone may access. As shown, assume that there are network policies 512 (e.g., a first through $n^{th}$ policy P) in force by policy engines across any number of different networks.

In various embodiments, device classification process 248 may include policy collector 502 configured to collect network policies 512 from the policy engines of the networks in communication with process 248. The collection of network policies 512 by policy collector 502 may be on a push or pull basis, as desired. After collection, policy collector 502 may store the retrieved policies 512 in a local database on the device executing device classification process 248 for further analysis. In some cases, policy collector 502 may also standardize network policies 512 prior to local storage such that they have a standardized format and associate each policy with one or more device types.

Device classification process 248 may also include a restrictiveness analyzer 504 that uses the network policy information collected and stored by policy collector 502 as proxies, to evaluate how critical a misclassification by device type classifier 508 would be. For instance, an administrator of a hospital network may decide to prevent all MRI machines from accessing the Internet, for security reasons. Now, any device that has full Internet access on this same network should never be confused with MRI machines, and vice-versa. This difference in the nature of the underlying policies, such as how restrictive each policy is, can serve as a blueprint for the clustering and/or classification of these devices by device type classifier 508, as well as other similar devices.

As used herein, the measures of restrictiveness/criticality of network policies 512 computed by restrictiveness analyzer 504 may be represented in terms of different "colors," with more restrictive policies receiving darker associated colors and less restrictive policies receiving lighter colors. For example, if one of policies 512 is more restrictive than another, it may be referred to as being darker than the second policy. Different policies can also have the same color and the ordering does not have to be strict. For example, the notion of restrictiveness may itself be governed by segmentation, dictating the rights associated to a Security Group Tag (SGT), VPN, or the like. Note that while the notion of colors is used to describe the techniques herein, the measures of policy restrictiveness may take other forms as well, such as on a sliding scale (e.g., 0-10, etc.) group assignments (e.g., "permissive," "partial," etc.), or the like.

During operation, restrictiveness analyzer 504 may derive the measures of restrictiveness of network policies 512 based on rules produced by subject matter experts that map any given policy to a restrictiveness measure (e.g., a color). For example, if the rules map policy elements to numerical scores, restrictiveness analyzer 504 can then process each element of a policy, to contribute to the final score or color of the policy.

In some embodiments, restrictiveness analyzer 504 can also dynamically adjust the color of a policy 512 as follows:
  Initially, restrictiveness analyzer 504 sets a color based only on the characteristics of the policy 512, based on how restrictive the policy is.
  With time, as devices are assigned this policy, restrictiveness analyzer 504 can refine the color based on information on the devices themselves. For instance, restrictiveness analyzer 504 can fine-tune the color of a policy 512 based on the threat index of the devices obtained from a security service such as Cisco Talos. Indeed, security remains one of the primary objectives of network segmentation and policing. As a result, confusing regular devices with others that are more likely to be compromised is undesirable, from a security perspective.

In further cases, restrictiveness analyzer 504 may determine the color of a policy 512, or fine-tune its color, manually by a user via an application programming interface (API) or via a user interface, such as user interface 514.

In yet another embodiment, colors assigned by restrictiveness analyzer 504 to policies 512 may vary with time. For example, if the probability of correct classification for an endpoint device by device type classifier 508 is below some threshold, the user may require the color to get darker with time. In such cases, the speed at which the color becomes darker may also vary with the level of criticality of the device.

Assigning colors to policies directly is an important aspect of the techniques herein. This is much easier and more realistic than coloring all the devices in the network. Still, in another embodiment, restrictiveness analyzer 504 may also allow for coloring of individual devices. This can be done similarly to the above, such as by using rules from subject matter experts, external data sources from security services (e.g., security feeds from Cisco Talos for the particular device, etc.) or fine-tuned by the user through explicit targeting of the device (e.g., using a MAC address, a username, or some other identifier). In this setting, not all devices need to be colored. In addition, note that this can also utilize a different color scale than that of network policies 512. Notably, the goal of coloring policies is to compare them, while the goal of coloring endpoints is to assign them a notion of criticality.

According to various embodiments, device classification process 248 may also include model adjuster 506 configured to adjust the clustering and/or classification model(s) of device type classifier 508 based on the coloring detailed above. At the root of the approach lies the fact that the costs of misclassifying different devices are variable and asymmetric. Assume, for example, the prediction by device type classifier 508 of a particular endpoint device is device type D1, but the ground truth is actual a different device type D2 (i.e., device type classifier 508 misclassifies device of type D2 as being of type D1). If D1 is colored with a color that is lighter than that of D2, the endpoint will be allowed more permissions on the network, as a result of the misclassification. This is much more serious than if D1 is darker than D2: in this case, the endpoint is applied a more restrictive policy than it should. Although this can be inconvenient, this does not imply an explicit security risk.

Thus, during execution, model adjuster 506 may use a cost-sensitive learning technique to take colors into account. In various embodiments, model adjuster 506 may do so using either of the following approaches:
  When only policies are colored by restrictiveness analyzer 504, model adjuster 506 may calculate and use class-dependent costs. In this setting, the cost of device type classifier 508 misclassifying an endpoint for type D1 while it is actually D2 only depends on the colors of D1 and D2. The form of a cost function based on the colors of D1 and D2 can be derived through experimentation and/or with the help of subject matter experts. One consideration is whether the cost on depends on the difference of colors, or also on absolute color values. Notably, cost functions depending only on the difference in color may be easier to experiment with, but they may misrepresent actual consequences of misclassification. In general, cost functions that also take into account absolute values of the colors are preferred.
  When some of the endpoints can also be associated with colors, model adjuster 506 may instead use exemplar-dependent costs. In this setting, the cost of device type classifier 508 misclassifying an endpoint for type D1 while it is actually of type D2 may depend on the colors of D1 and D2, but also on the color of the example itself (which reflects a notion of criticality of the endpoint).

Regardless of which approach above is used by restrictiveness analyzer 504, machine learning techniques addressing cost-sensitive classification mostly fall in two categories: techniques designed for cost-sensitive classification, and generic "conversion methods" for converting existing algorithms to cost-sensitive settings. Although both can be used, explicitly cost-sensitive methods are a better fit for this type of use case, especially with exemplar-dependent costs. However, restrictiveness analyzer 504 may still use generic conversions to easily augment existing device classifiers with color sensitivity.

As noted above, device type classifier 508 may use multi-class classification or clustering, to assign device types to endpoint devices. Accordingly, model adjuster 506 may address either of these approaches as follows:

When the model of device type classifier 508 is a machine learning-based classifier (e.g., a random forest model, etc.) model adjuster 506 may adjust the model in any number of different ways. In one embodiment, model adjuster 506 may simply employ a regression method that uses an adjusted loss. For example, model adjuster 506 may reweight training samples based on whether they cause confusion between differently colored classes. Further method that model adjuster 506 could use may be more tailored, to accommodate the cost-sensitive aspect of the problem. For instance, model adjuster 506 could use any number of approaches that train decision trees or random forests in a cost sensitive manner by also taking into account the cost when choosing the tree splits. More generally, model adjuster 506 may use any supervised discriminative approach, to adjust the classifier.

When device type classifier 508 relies on clustering, one of the simplest approaches would be for model adjuster 506 to incorporate the color as a feature for the clustering, thus moving further apart devices with different colors.

Said differently, a key objective herein is to provide a notion of badness of misclassification by device type classifier 508 using measures of restrictiveness and/or endpoint criticality (e.g., as represented by colors), in order to minimize the downside of misclassification (e.g. classify a device as belonging to a class darker than it is less problematic than the opposite). Doing so already has a direct impact on how device type classifier 508 ultimately classifies endpoint device and, consequently, which of network policies 512 are applied to the classified endpoint device.

In some embodiments, device classification process 248 may also include a policy suggestion engine 510 that uses the outcome of the refined clustering and/or classification of device type classifier 508 to suggest new policies to end users. Indeed, if a user A has not defined any policy for the MRI machines in his or her network, policy suggestion engine 510 may learn from other networks (e.g., from the policy information collected by policy collector 502) that blacklisting them from Internet access is a common practice among the various networks. In turn, policy suggestion engine 510 may suggest this policy to user A via user interface 514. These suggestions can also be used as a form of crowd-sourced feedback on the relevance of the coloring for this particular cluster or group of devices. Indeed, if user A declines to apply the policy, it may be an indication that the distinction between this group and other devices is not as critical as originally believe.

Figure 6:
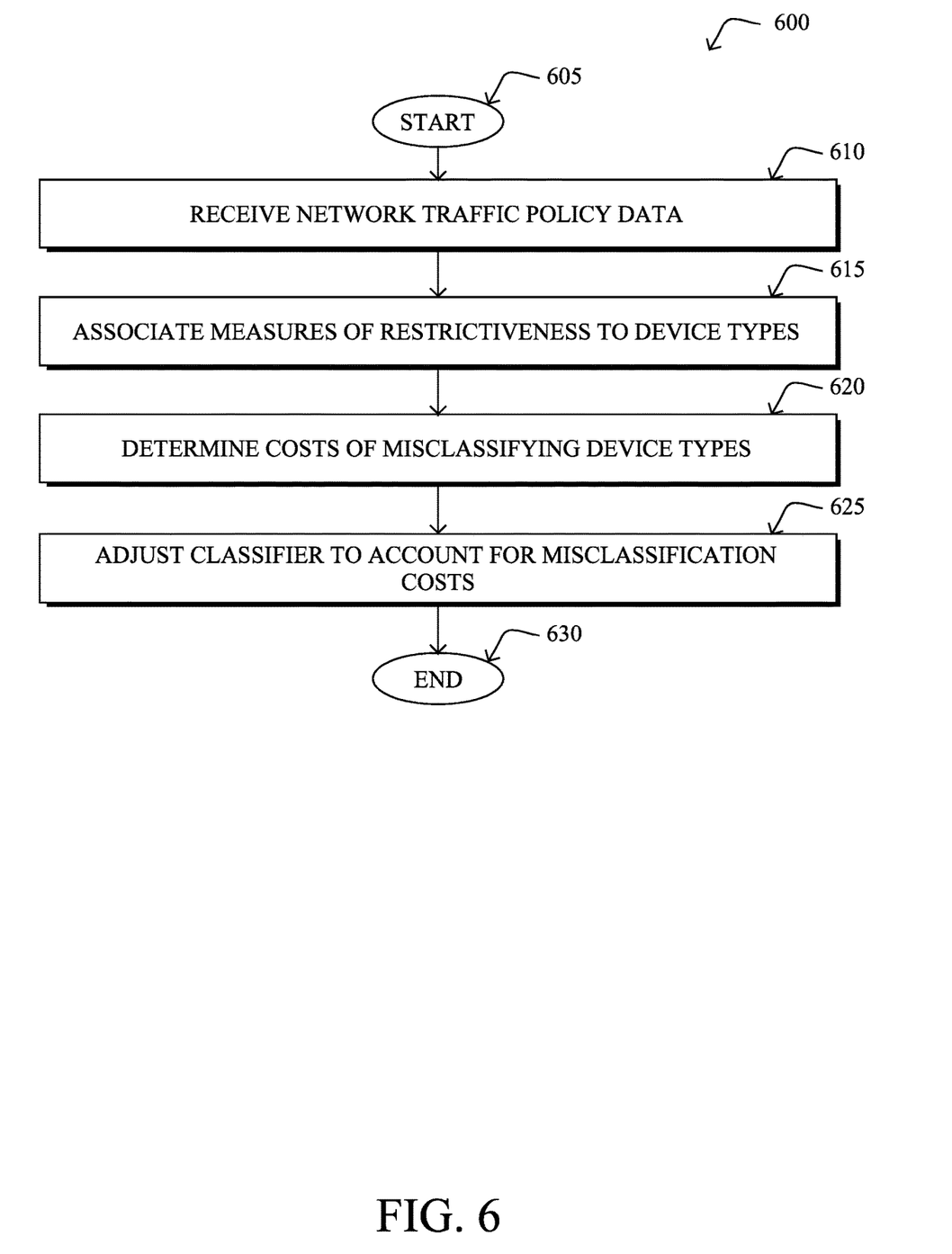
FIG. 6 illustrates an example simplified procedure for adjusting a machine learning model-based device type classifier.

FIG. 6 illustrates an example simplified procedure for adjusting a machine learning model-based device type classifier, in accordance with one or more embodiments described herein. For example, a non-generic, specifically configured device (e.g., device 200) may perform procedure 600 by executing stored instructions (e.g., process 248), to provide a device classification service to one or more networks. The procedure 600 may start at step 605, and continues to step 610, where, as described in greater detail above, the device classification service may receive data indicative of network traffic policies assigned to a plurality of device types. For example, one policy may restrict endpoints of a certain device type from accessing a particular resource, while another policy may allow endpoints of a different device type to access that resource.

At step 615, as detailed above, the device classification service may associate measures of policy restrictiveness with the device types, based on the received data indicative of the network traffic policies assigned to the plurality of device types. For example, the measures of policy restrictiveness may be represented as colors, with lighter colors representing more permissive policies, along another form of sliding scale (e.g., on a numerical scale), or as permissiveness/restrictiveness groups. In some embodiments, the service may also associate colors with At step 620, the device classification service may determine misclassification costs associated with a machine learning-based device type classifier of the service misclassifying an endpoint device of one of the plurality device types with another of the plurality of device types, based on their associated measures of policy restrictiveness, as described in greater detail above. In some embodiments, the misclassification costs may be class-dependent and computed, for example, by comparing the difference in the computed measures or absolute values of the measures. In further embodiments, when colors or other measures of device criticality are associated with endpoint device, the service may instead determine the misclassification costs as exemplar-dependent costs by taking into account the class-dependent costs, as well as the color of the example itself (e.g., as based on a threat assessment of the endpoint by a security process in the network).

At step 625, as detailed above, the device classification service may adjust the machine learning-based device type classifier to account for the determined misclassification costs. The service may do so in any number of ways, depending on the machine learning approach taken by the classifier. In some embodiments, if the classifier comprises a decision tree-based model (e.g., a random forest, etc.), it may also take into account the determined misclassification costs when determining tree splits. In further embodiments, if the classifier uses a clustering process to cluster similar endpoint devices, the service may use the measures as further input (e.g., in conjunction with the telemetry data for the endpoint devices). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for device type classification in a network that also takes into account the practical costs of the classifier misclassifying an endpoint of one device type as being of another type. Notably, as the classification is often used to apply network policies to the endpoint devices based on their device types, misclassification can have a major or minor impact on the device, depending on the actual and predicted device types of the endpoint device.

While there have been shown and described illustrative embodiments that provide for the refinement of device classification and clustering based on policy coloring, it is to be understood that various other adaptations and modifications may be made within the spirit and scope of the embodiments herein. For example, while certain embodiments are described herein with respect to using certain models for purposes of classifying the device types of endpoint devices, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device classification service, data indicative of network traffic policies assigned to a plurality of device types;
   associating, by the device classification service, measures of policy restrictiveness with the device types, based on the received data indicative of the network traffic policies assigned to the plurality of device types;
   determining, by the device classification service, misclassification costs associated with a machine learning-based device type classifier of the service misclassifying an endpoint device of a first device type as a second device type, wherein the misclassification costs are determined based on both of a measure of criticality associated with the endpoint device and a difference between the measure of policy restrictiveness associated with the first device type and the measure of policy restrictiveness associated with the second device type; and
   adjusting, by the device classification service, the machine learning-based device type classifier to account for the determined misclassification costs.

2. The method as in claim 1, further comprising:
   classifying, by the device classification service, an endpoint device in a network with a particular one of the plurality of device types, using traffic telemetry data regarding network traffic associated with the particular endpoint device as input to the adjusted machine learning-based device type classifier; and
   providing, by the device classification service, an indication of the particular device type of the particular endpoint device to a networking device in the network, wherein the networking device applies one of the network policies to the particular endpoint device based on the particular device type.

3. The method as in claim 1, wherein the device classification service receives the data indicative of the network traffic policies from a plurality of networks, the method further comprising:
   identifying, by the device classification service, one of the network traffic policies as not being implemented in one of the networks for one of the device types; and
   sending, by the device classification service, data regarding the identified traffic policy to a user interface associated with the network in which the identified traffic policy is not implemented.

4. The method as in claim 1, wherein adjusting the device type classifier to account for the determined misclassification costs comprises:
   applying a supervised discriminative algorithm to the device type classifier based in part on the determined misclassification costs.

5. The method as in claim 1, wherein the machine learning-based classifier comprises a clustering process that clusters endpoint devices based on their associated traffic telemetry data, and wherein adjusting the device type classifier to account for the determined misclassification costs comprises:
   including, with the traffic telemetry data of the endpoint devices, the measures of policy restrictiveness as input features for the clustering process.

6. The method as in claim 1, further comprising:
   associating, by the device classification service, measures of criticality with endpoint devices to which the network traffic policies were applied.

7. The method as in claim 1, wherein adjusting the device type classifier to account for the determined misclassification costs comprises:
   reweighting training samples for the classifier using the determined misclassification costs.

8. An apparatus, comprising:
   one or more network interfaces to communicate with a network;
   a processor coupled to the network interfaces and configured to execute one or more processes; and
   a memory configured to store a process executable by the processor, the process when executed configured to:
   receive data indicative of network traffic policies assigned to a plurality of device types;
   associate measures of policy restrictiveness with the device types, based on the received data indicative of the network traffic policies assigned to the plurality of device types;
   determine misclassification costs associated with a machine learning-based device type classifier misclassifying an endpoint device of a first device type as a second device type, wherein the misclassification costs are determined based on both of a measure of criticality associated with the endpoint device and a difference between the measure of policy restrictiveness associated with the first device type and the measure of policy restrictiveness associated with the second device type; and
   adjust the machine learning-based device type classifier to account for the determined misclassification costs.

9. The apparatus as in claim 8, wherein the process when executed is further configured to:
   classify an endpoint device in a network with a particular one of the plurality of device types, using traffic telemetry data regarding network traffic associated with the particular endpoint device as input to the adjusted machine learning-based device type classifier; and
   provide an indication of the particular device type of the particular endpoint device to a networking device in the network, wherein the networking device applies one of the network policies to the particular endpoint device based on the particular device type.

10. The apparatus as in claim 8, wherein the apparatus receives the data indicative of the network traffic policies from a plurality of networks, wherein the process when executed is further configured to:
identify one of the network traffic policies as not being implemented in one of the networks for one of the device types; and
send data regarding the identified traffic policy to a user interface associated with the network in which the identified traffic policy is not implemented.

11. The apparatus as in claim 8, wherein the apparatus adjusts the device type classifier to account for the determined misclassification costs by:
selecting splits of decision trees in the classifier based in part on the determined misclassification costs.

12. The apparatus as in claim 8, wherein the machine learning-based classifier comprises a clustering process that clusters endpoint devices based on their associated traffic telemetry data, and wherein the apparatus adjusts the device type classifier to account for the determined misclassification costs by:
including, with the traffic telemetry data of the endpoint devices, the measures of policy restrictiveness as input features for the clustering process.

13. The apparatus as in claim 8, wherein the process when executed is further configured to:
associate measures of criticality with endpoint devices to which the network traffic policies were applied.

14. The apparatus as in claim 8, wherein the apparatus adjusts the device type classifier to account for the determined misclassification costs by:
reweighting training samples for the classifier using the determined misclassification costs.

15. A tangible, non-transitory, computer-readable medium storing program instructions that cause device classification service to execute a process comprising:
receiving, at the device classification service, data indicative of network traffic policies assigned to a plurality of device types;
associating, by the device classification service, measures of policy restrictiveness with the device types, based on the received data indicative of the network traffic policies assigned to the plurality of device types;
determining, by the device classification service, misclassification costs associated with a machine learning-based device type classifier of the service misclassifying an endpoint device of a first device type as a second device type, wherein the misclassification costs are determined based on both of a measure of criticality associated with the endpoint device and a difference between the measure of policy restrictiveness associated with the first device type and the measure of policy restrictiveness associated with the second device type; and
adjusting, by the device classification service, the machine learning-based device type classifier to account for the determined misclassification costs.

16. The computer-readable medium as in claim 15, wherein the process further comprises:
classifying, by the device classification service, an endpoint device in a network with a particular one of the plurality of device types, using traffic telemetry data regarding network traffic associated with the particular endpoint device as input to the adjusted machine learning-based device type classifier; and
providing, by the device classification service, an indication of the particular device type of the particular endpoint device to a networking device in the network, wherein the networking device applies one of the network policies to the particular endpoint device based on the particular device type.

17. The computer-readable medium as in claim 15, wherein the device classification service receives the data indicative of the network traffic policies from a plurality of networks, and wherein the process further comprises:
identifying, by the device classification service, one of the network traffic policies as not being implemented in one of the networks for one of the device types; and
sending, by the device classification service, data regarding the identified traffic policy to a user interface associated with the network in which the identified traffic policy is not implemented.

18. The computer-readable medium as in claim 15, wherein the machine learning-based classifier comprises a clustering process that clusters endpoint devices based on their associated traffic telemetry data, and wherein adjusting the device type classifier to account for the determined misclassification costs comprises:
including, with the traffic telemetry data of the endpoint devices, the measures of policy restrictiveness as input features for the clustering process.

* * * * *